(12) United States Patent
Lee

(10) Patent No.: US 10,586,972 B2
(45) Date of Patent: Mar. 10, 2020

(54) BATTERY PACK

(71) Applicant: LG CHEM, LTD., Seoul (KR)

(72) Inventor: Chul Kyu Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 7 days.

(21) Appl. No.: 15/554,887

(22) PCT Filed: Jul. 11, 2016

(86) PCT No.: PCT/KR2016/007523
§ 371 (c)(1),
(2) Date: Aug. 31, 2017

(87) PCT Pub. No.: WO2017/039139
PCT Pub. Date: Mar. 9, 2017

(65) Prior Publication Data
US 2018/0047970 A1 Feb. 15, 2018

(30) Foreign Application Priority Data
Sep. 2, 2015 (KR) ........................ 10-2015-0124200

(51) Int. Cl.
*H01M 2/34* (2006.01)
*H01M 2/02* (2006.01)
*H01M 2/20* (2006.01)
*H01M 10/0525* (2010.01)

(52) U.S. Cl.
CPC ........... *H01M 2/34* (2013.01); *H01M 2/0202* (2013.01); *H01M 2/0237* (2013.01); *H01M 2/204* (2013.01); *H01M 2/206* (2013.01); *H01M 2/202* (2013.01); *H01M 2/348* (2013.01); *H01M 10/0525* (2013.01); *H01M 2200/103* (2013.01); *H01M 2220/20* (2013.01); *H01M 2220/30* (2013.01)

(58) Field of Classification Search
None
See application file for complete search history.

(56) References Cited

U.S. PATENT DOCUMENTS

| | | |
|---|---|---|
| 8,216,708 B2 | 7/2012 | Jang et al. |
| 9,640,789 B2 | 5/2017 | Yang et al. |
| 9,887,413 B2 | 2/2018 | Choi et al. |

(Continued)

FOREIGN PATENT DOCUMENTS

| | | |
|---|---|---|
| CN | 200993978 Y | 12/2007 |
| CN | 101150204 A | 3/2008 |

(Continued)

OTHER PUBLICATIONS

International Search Report issued in PCT/KR2016/007523 (PCT/ISA/210), dated Oct. 17, 2016.

(Continued)

*Primary Examiner* — Amanda J Barrow
(74) *Attorney, Agent, or Firm* — Birch, Stewart, Kolasch & Birch, LLP

(57) ABSTRACT

The present invention relates to a battery pack capable of improving stability from safety issues occurring in an overcurrent state. The battery pack includes a unit cell, a bus bar electrically connected to the unit cell and short-circuited by overcurrent, and a protection part disposed in the bus bar to absorb spark occurring when the bus bar is short-circuited.

9 Claims, 4 Drawing Sheets

(56) References Cited

U.S. PATENT DOCUMENTS

| | | | |
|---|---|---|---|
| 2007/0099073 A1* | 5/2007 | White | H01M 2/1055 429/158 |
| 2008/0070067 A1* | 3/2008 | Jang | H01M 2/30 429/8 |
| 2009/0189730 A1* | 7/2009 | Oh | H01H 85/10 337/186 |
| 2010/0310911 A1 | 12/2010 | Yamamoto et al. | |
| 2011/0104555 A1 | 5/2011 | Han et al. | |
| 2012/0126929 A1* | 5/2012 | Tong | H01H 85/36 337/142 |
| 2013/0161063 A1* | 6/2013 | Gould | H01B 3/00 174/113 R |
| 2013/0234822 A1* | 9/2013 | Aurich | B22D 41/015 337/416 |
| 2013/0344379 A1* | 12/2013 | Yang | H01M 2/348 429/158 |
| 2014/0035717 A1* | 2/2014 | Nomura | H01H 85/153 337/186 |
| 2014/0065467 A1 | 3/2014 | Choi et al. | |
| 2014/0134884 A1* | 5/2014 | Okamoto | B60L 58/10 439/627 |
| 2014/0154559 A1 | 6/2014 | Mori et al. | |
| 2014/0315051 A1* | 10/2014 | Han | H01M 2/202 429/61 |
| 2015/0017507 A1 | 1/2015 | Yang et al. | |
| 2015/0171413 A1* | 6/2015 | Schweinbenz | H01M 2/202 429/61 |
| 2015/0204476 A1* | 7/2015 | Lazzara | F16L 9/042 138/99 |
| 2015/0280185 A1 | 10/2015 | Lampe-Onnerud et al. | |
| 2017/0271635 A1 | 9/2017 | Lampe-Onnerud et al. | |
| 2018/0097212 A1 | 4/2018 | Lampe-Onnerud et al. | |
| 2018/0198172 A1* | 7/2018 | Choi | H01M 2/26 |

FOREIGN PATENT DOCUMENTS

| | | | | |
|---|---|---|---|---|
| CN | 103650209 A | | 3/2014 | |
| CN | 104620420 A | | 5/2015 | |
| DE | 10 2012 017 348 | * | 3/2014 | H01H 85/00 |
| EP | 1942174 | * | 7/2008 | C09K 21/14 |
| EP | 2 887 430 A1 | | 6/2015 | |
| GB | 1096686 | * | 12/1967 | H01M 1/02 |
| JP | 2002-358865 A | | 12/2002 | |
| JP | 2010-53196 A | | 3/2010 | |
| JP | 2010-282795 A | | 12/2010 | |
| JP | 2013-073929 | * | 4/2013 | H01M 2/10 |
| JP | 2013-73929 A | | 4/2013 | |
| JP | 2013-196932 A | | 9/2013 | |
| JP | 2014-110233 A | | 6/2014 | |
| JP | 2015-536524 A | | 12/2015 | |
| KR | 10-2011-0060480 A | | 6/2011 | |
| KR | 20-2011-0008263 U | | 8/2011 | |
| KR | 10-2012-0050799 A | | 5/2012 | |
| KR | 10-2013-0080023 A | | 7/2013 | |
| KR | 10-2014-0136246 A | | 11/2014 | |
| WO | WO 2014/189220 A1 | | 11/2014 | |

OTHER PUBLICATIONS

European Search Report for Appl. No. 16842105.5 dated Nov. 14, 2017.

* cited by examiner

BATTERY PACK

CROSS-REFERENCE TO RELATED APPLICATION

The present application claims the benefit of the priority of Korean Patent Application No. 10-2015-0124200, filed on Sep. 2, 2015, which is hereby incorporated by reference in its entirety.

TECHNICAL FIELD

The present invention relates to a battery pack, and more particularly, to a battery pack capable of improving stability from safety issues occurring in an overcurrent state.

BACKGROUND ART

Rechargeable secondary batteries have been actively studied for the development of digital cameras, mobile phones, lap-top PCs, power tools, electric bicycles, electric vehicles, hybrid vehicles, and large-capacity power storage devices.

Particularly, lithium secondary batteries have a relatively high energy density per unit weight and are rapidly chargeable when compared with other secondary batteries such as lead storage batteries, nickel-cadmium batteries, nickel-hydrogen batteries and nickel-zinc batteries, and thus, their use is rapidly increasing.

Such a lithium secondary battery has a working voltage of 3.6 V or more and may be used as power sources for portable electronic devices or used for electric vehicles, hybrid vehicles, power tools, electric bicycles, power storage devices, uninterruptible power supplies (UPSs), and the like, in which a plurality of batteries are connected in series or in parallel to each other, and an high output is required.

Since the lithium secondary battery has a working voltage greater three times than that of a nickel-cadmium battery or a nickel metal hydride battery and has an excellent energy density per unit weight, its use is rapidly increasing.

The lithium secondary battery may be classified into a lithium ion battery using a liquid electrolyte and a lithium ion polymer battery using a polymer solid electrolyte according to types of electrolyte.

Also, the lithium ion polymer battery may be classified into a fully solid lithium ion polymer battery which does not contain any electrolytic solution at all and a lithium ion polymer battery which uses a gel-type polymer electrolyte containing an electrolytic solution according to kinds of polymer solid electrolyte.

In case of the lithium ion battery using the liquid electrolyte, most of the batteries are used in a sealed form by using a cylindrical or square metal can as a container.

As described above, since the secondary battery using the metal can as the container has a fixed shape, there is a disadvantage in that the design of the electrical product using the metal can as a power source is limited, and it is difficult to reduce its volume.

Thus, a pouch type secondary battery in which an electrode assembly and an electrolyte are put into a pouch packing material made of a film and then sealed has been developed and is being used.

However, if the lithium secondary battery is overheated, since there is a risk of explosion, securing safety is one of important tasks.

The overheating of the lithium secondary battery is caused by various causes, and on of them is a flow of overcurrent beyond the limit through the lithium secondary battery.

When the overcurrent flows, the lithium secondary battery generates heat by Joule's heat, and thus, an internal temperature of the battery rapidly increases.

Also, the rapid temperature increase brings about a decomposition reaction of an electrolyte solution to cause a thermal running phenomenon, resulting in explosion of the battery.

The overcurrent occurs when rush current is applied to the battery due to insulation breakdown between a positive electrode and a negative electrode, which is caused by penetration of a pointed metal object through the lithium secondary battery or shrinkage of a separator interposed between the positive electrode and the negative electrode, or due to an abnormal condition of an external charging circuit or load being connected to the outside.

Thus, to protect the lithium secondary battery from an abnormal situation such as an occurrence of the overcurrent, the battery is used in combination with a protection circuit.

In general, the protection circuit includes a fuse device that irreversibly disconnects a line through which charging or discharging current flows when the overcurrent occurs.

A conventional battery pack and a connecting bar applied thereto are disclosed in Korean Patent Publication No. 10-2013-0080023.

However, the conventional connecting bar has a limitation in safety in that the battery is damaged by spark generated when an external short-circuit of the battery occurs, and the battery is ignited.

DISCLOSURE OF THE INVENTION

Technical Problem

Therefore, the present invention has been made to solve the abovementioned limitations, and an object of the prevent invention is to provide a battery pack capable of reducing or absorbing damage due to spark occurring in an overcurrent state.

Technical Solution

According to an aspect of the present invention, there is provided a battery pack including: a unit cell; a bus bar electrically connected to the unit cell and short-circuited by overcurrent; and a protection part disposed in the bus bar to absorb spark occurring when the bus bar is short-circuited.

The protection part may be disposed at a portion at which the bus bar is short-circuited.

The protection part may include: an absorption member surrounding the bus bar to absorb the spark; a case member sealing the absorption member therein to protect a portion of the bus bar; and an endothermic agent injected into the case member and accommodated in a space between the absorption member and the case member.

A notch part short-circuited by the overcurrent may be provided in the bus bar, and the absorption member may surround the notch part.

The absorption member may include at least one of aramid fiber, ceramic fiber, and silicon carbide fiber.

The endothermic agent may include silica and water.

The case member may have a polygonal or cylindrical shape.

The case member may be made of at least one non-conductive material selected from plastic, tempered glass, and rubber.

Advantageous Effects

According to the present invention, there is an effect that the protection part including the aramid fiber is installed in the bus bar to absorb the damage due to the spark occurring when the bus bar is short-circuited.

According to the present invention, there is an effect that the protection part including the aramid fiber and the endothermic agent is installed in the bus bar to remove the spark occurring when the bus bar is short-circuited.

According to the present invention, there is an effect that the protection part including the endothermic agent is installed in the bus bar to control the heat generated when the bus bar is short-circuited.

According to the present invention, there is an effect that the protection part including the non-conductive case member is installed in the bus bar to protect the notch part of the bus bar.

MODE FOR CARRYING OUT THE INVENTION

Figure 1:
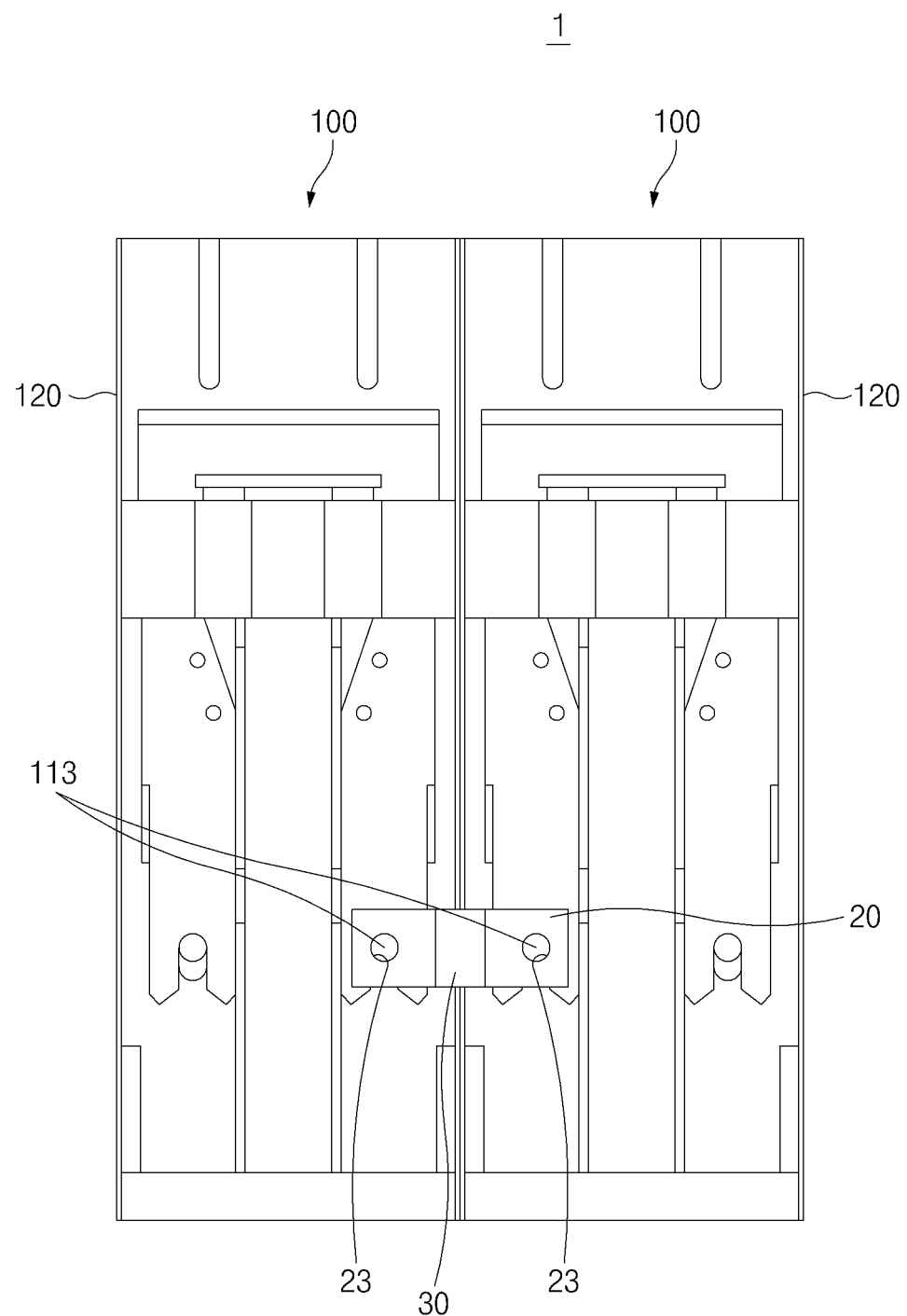
FIG. 1 is a schematic front view illustrating a main part of a battery pack according to an embodiment of the present invention.

Hereinafter, the present invention will be described with reference to the accompanying drawings. Since the present invention may have diverse modified embodiments, specific embodiments are illustrated in the drawings and are described in detail. However, this does not limit the present invention within specific embodiments and it should be understood that the present invention covers all the modifications and/or equivalents and replacements within the idea and technical scope of the present invention. Like reference numerals are used for referring to the same or similar elements in the description and drawings. FIG. 1 is a schematic front view illustrating a main part of a battery pack according to an embodiment of the present invention, and FIG. 2 is a perspective view illustrating a state in which a battery cover of a battery module is removed to show the inside thereof in FIG. 1.

Figure 2:
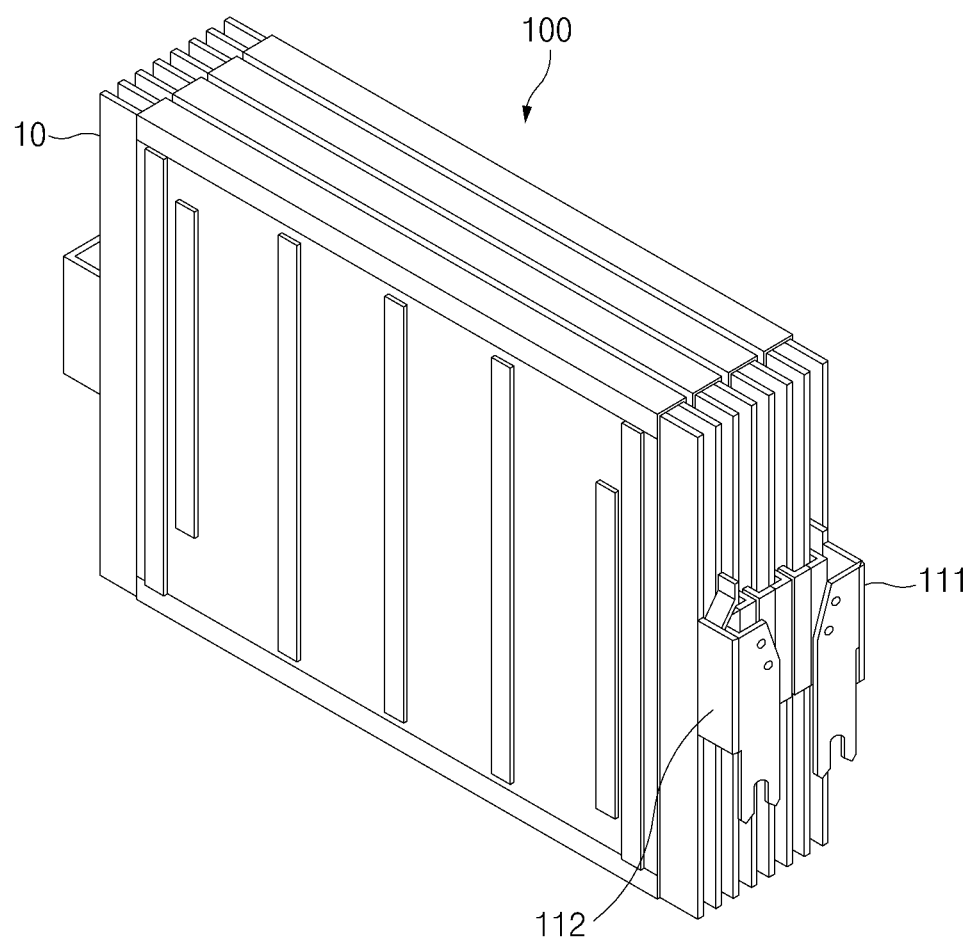
FIG. 2 is a perspective view illustrating a state in which a battery cover of a battery module is removed to show the inside thereof in FIG. 1.

As illustrated in FIGS. 1 and 2, a battery pack 1 according to an embodiment of the present invention includes a unit cell 10, a bus bar 20 electrically connected to the unit cell 10 and short-circuited by overcurrent, and a protection part 30 provided in the bus bar 20 to absorb spark occurring when the bus bar 20 is short-circuited.

The battery pack 1 according to the present invention may be constituted by a plurality of battery modules 100, which are connected in series or in parallel to each other according to the use thereof.

In FIG. 1, only a case in which two battery modules 100 are connected in series to each other will be illustrated.

However, the present invention is not limited thereto, and thus, it is obvious that, if necessary, the appropriate number of battery modules 100 are connected in series or in parallel to each other.

Each of the battery modules 100 includes at least one unit cell 10 and a battery cover 120 surrounding the unit cell 10.

The unit cell 10 includes an electrode assembly (not shown) accommodated in a casing and first and second electrode leads 111 and 112 respectively connected to non-coating portions of first and second electrode plates of the electrode assembly and then led out to one side and the other side of the casing.

In this specification, a case in which the first and second electrode plates are respectively provided as positive and negative electrode plates will be described as an example, and thus, a case in which the first and second electrode leads 111 and 112 are respectively provided as positive and negative electrode leads will be described below.

In general, the first electrode plate that is the positive electrode plate is made of an aluminum (Al) material, and the second electrode plate that is the positive electrode plate is made of a copper (Cu) material.

Thus, the positive electrode lead 111 may be made of the same aluminum material as the positive electrode plate, and the negative electrode lead 112 may be made of the same copper (Cu) material as the negative electrode plate or a copper (Cu) material coated with nickel (Ni) in terms of weldability between the electrode plates and the electrode leads 111 and 112 and minimize electrical resistance thereof.

When the unit cells 10 is provided in plurality, the unit cells 10 may be connected in series or in parallel to each other according to the use. However, in this specification, the case in which the unit cells 10 are connected in series to each other will be described as an example.

That is, the unit cells 10 may be connected to each other by coupling the positive electrode lead 111 of one unit cell 10 to the negative electrode lead 112 of the adjacent unit cell 10.

In this case, each of the positive electrode lead 111 of the unit cell 10 that is disposed at the outermost rear side and the negative electrode lead 112 of the unit cell 10 that is disposed at the outermost front side is connected to the bus bar 20.

The number of unit cells 10 is not limited to the drawings, and thus, it is obvious that the number of unit cells may vary according to the use of the secondary battery.

Figure 3:
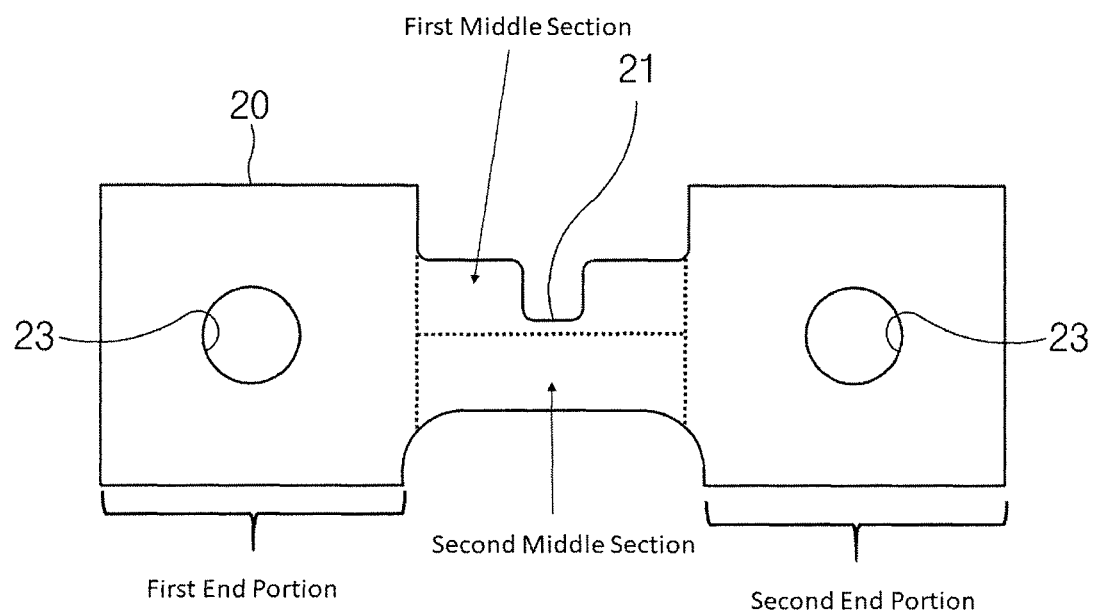
FIG. 3 is an enlarged view of only a bus bar in FIG. 1.
Figure 3:
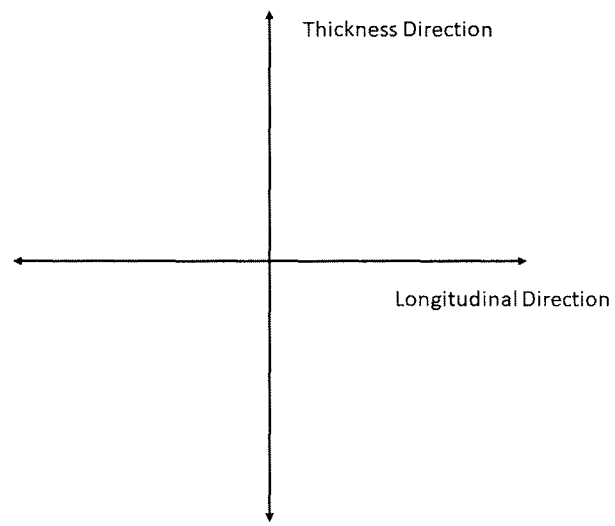

FIG. 3 is an enlarged view of only a bus bar in FIG. 1.

As illustrated in FIG. 3, the bus bar 20 is made of a thin plate-shaped alloy.

Also, a coupling hole 23 is punched in each of both sides of the bus bar 20, and a notch part 21 is disposed at a center of the bus bar 20.

The notch part 21 has a predetermined depth inward from the outside of the center of the bus bar 20 in a thickness direction.

A cross-sectional area of the bus bar 20 is reduced by the depth of the notch part 21, and thus, electrical resistance is reduced at the portion at which the notch part 21 is provided. The notch part 21 is disposed at a center of the bus bar 20 along a longitudinal direction of the bus bar 20. The bus bar 20 further includes a first middle portion at a first side of the bus bar 20 surrounding the notch part and a second middle portion at a second side of the bus bar 20, and first and second end portions connected to the first and second middle portions. The first and second end portions are spaced apart in the longitudinal direction. The notch part 21 is smaller in a thickness direction than the first and second middle portions, the thickness direction is perpendicular to the longitudinal direction, and the first and second middle portions are smaller in the thickness direction than each of the first and second end portions. The first middle portion has a different shape than the second middle portion. The first middle portion extends in the longitudinal direction from the first end portion to the second end portion, and the second middle portion extends in the longitudinal direction from the first end portion to the second end portion.

Accordingly, the bus bar 20 including the notch part 21 may be easily broken when overcurrent flows.

An external terminal 113 protrudes from each of the positive electrode lead 111 of the unit cell 10, which is disposed at the outermost rear side, and the negative electrode lead 112 of the unit cell 10, which is disposed at the outermost front side, of the battery module 100.

Also, as illustrated in FIG. 1, when the bus bar 20 is installed in the battery module 100, the external terminal 113 is coupled to be fitted into the coupling hole 23 of the bus bar 20.

That is, the coupling hole 23 punched in one side of the bus bar 20 is coupled to the external terminal 113 disposed on the positive electrode lead 111 of one battery module 100, and the coupling hole 23 punched in the other side of the bus bar 20 is coupled to the external terminal 113 disposed on the negative electrode lead 112 of the other battery module 100 to allow the bus bar 20 to be electrically connected to the two battery modules 100.

Figure 4:
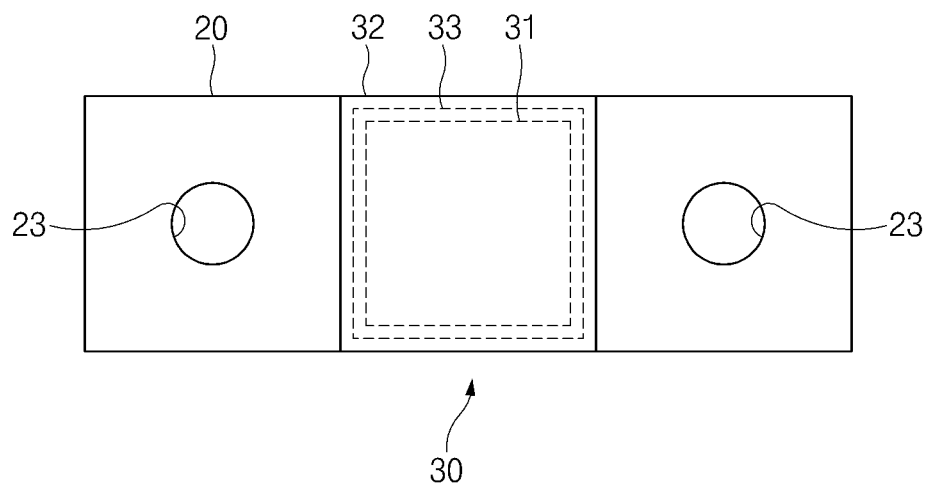
FIG. 4 is a view illustrating a state in which a protection part is installed in the bus bar of FIG. 3.

FIG. 4 is a view illustrating a state in which a protection part is installed in the bus bar of FIG. 3.

As illustrated in FIG. 4, a protection part 30 is installed in the bus bar 20. The protection part 30 is installed to surround the notch part 21 of the bus bar 20. The protection part 30 is disposed over an entirety of the notch part 21 and an entirety of the first and second middle portions. The protection part 30 is configured to absorb spark occurring at the notch part 21, including when the bus bar 20 is short-circuited.

As described above, a reason in which the protection part 30 is installed in the notch part 21 is for allowing the protection part 30 to absorb and remove the spark occurring when the bus bar 20 is short-circuited and thereby to prevent the battery module 100 from being damaged and ignited.

That is, when the overcurrent flows through the battery pack 1, the notch part 21 of the bus bar 20 is short-circuited to block the overcurrent.

Here, while the notch part 21 is short-circuited, the spark may occur. Thus, the protection part 30 may absorb or remove the spark to secure safety of the battery pack 1.

The protection part 30 includes an absorption member 31 surrounding the notch part 21 of the bus bar 20 to absorb the spark occurring when the notch part 21 is short-circuited, a case member 32 sealing the absorption member 31 therein to protect the notch part 21 of the bus bar 20, and an endothermic agent 33 injected into the case member 32 and accommodated between the absorption member 31 and the case member 32 to control heat generated when the notch part 21 is short-circuited and remove the spark.

The absorption member 31 is made of at least one of aramid fiber, ceramic fiber, and silicon carbide fiber, which have excellent heat resistance, to effectively absorb and remove the spark occurring when the notch part 21 is short-circuited and prevent heat from being generated.

The endothermic agent 33 is constituted by silica and water to effectively control the heat generated when the notch part 21 is short-circuited and remove the spark.

According to an embodiment, the endothermic agent 33 may be formed to have a ratio of 10% of silica and 90% of water in the total content of the endothermic agent 33, but is not limited thereto. For example, if necessary, the content ratio of silica to water in the endothermic agent 33 may be changed.

The case member 32 has a polygonal or cylindrical shape, but is not limited thereto. For example, the case member 32 may have various shapes so long as the case member 32 accommodates the notch part 21 of the bus bar 20 therein to protect the notch part 21, seals the absorption member 31 surrounding the notch part 21 therein, and seals the endothermic agent 33 accommodated therein to prevent the endothermic agent 33 from leaking to the outside.

Also, the case member 32 may be made of at least one non-conductive material selected from plastic, tempered glass, and rubber, but is not limited thereto. For example, the case member 32 may be made of the known non-conductive material in addition to the above-described materials.

A method for installing the protection part 30 in the bus bar 20 will be described below.

The absorption member 31 is rolled into the case member 32 of which the inside is opened.

Then, the bus bar 20 is inserted into the absorption member 31 so that the absorption member 31 surrounds the notch part 21 of the bus bar 20.

Then, the endothermic agent 33 is filled into the case member 32 so that the endothermic agent 33 is filled between the case member 32 and the absorption member 31.

Then, the case member 32 is closed to seal the inside of the case member 32.

The battery pack according to the present invention may have an effect in which the protection part including the aramid fiber is installed in the bus bar to absorb the damage due to the spark occurring when the bus bar is short-circuited.

According to the present invention, there is an effect that the protection part including the aramid fiber and the endothermic agent is installed in the bus bar to remove the spark occurring when the bus bar is short-circuited.

According to the present invention, there is an effect that the protection part including the endothermic agent is installed in the bus bar to control the heat generated when the bus bar is short-circuited.

According to the present invention, there is an effect that the protection part including the non-conductive case member is installed in the bus bar to protect the notch part of the bus bar.

Although the battery pack according to the present invention has been described with reference to the exemplary drawings, various changes and modifications may be made thereto by one skilled in the art without departing from the scope and spirit of the invention as set forth in the appended claims.

The invention claimed is:

1. A battery pack comprising:
   a plurality of battery modules, wherein each battery module includes at least one unit cell and a battery cover;
   a bus bar electrically connected to at least two of the plurality of battery modules, wherein the bus bar is configured to be short-circuited by overcurrent generated from the at least two of the plurality of battery modules; and
   a protection part coupled to the bus bar,
   wherein the bus bar includes:
   a notch part disposed at a center of the bus bar along a longitudinal direction;
   a first middle portion at a first side of the bus bar surrounding the notch part and a second middle portion at a second side of the bus bar; and
   first and second end portions connected to the first and second middle portions,
   wherein the first and second end portions are spaced apart in the longitudinal direction,
   wherein the notch part is smaller in a thickness direction than the first and second middle portions, wherein the first and second middle portions are smaller in the thickness direction than each of the first and second end portions, wherein the thickness direction is perpendicular to the longitudinal direction, wherein the protection part is disposed over an entirety of the notch part and an entirety of the first and second middle portions and the protection part is configured to absorb spark occurring at the notch part when the bus bar is short-circuited, wherein the protection part comprises:

an absorption member surrounding the notch part of the bus bar, the absorption member being configured to absorb the spark;

a case member sealing the absorption member therein and configured to protect a portion of the bus bar; and an endothermic agent provided in the case member and accommodated in a space between the absorption member and the case member, and wherein the endothermic agent comprises silica and water.

2. The battery pack of claim 1, wherein the absorption member comprises at least one of aramid fiber, ceramic fiber, and silicon carbide fiber.

3. The battery pack of claim 1, wherein the case member has a polygonal or cylindrical shape.

4. The battery pack of claim 1, wherein the case member is made of at least one non-conductive material selected from plastic, tempered glass, and rubber.

5. The battery pack of claim 1, wherein the bus bar further comprises two coupling holes spaced apart in the longitudinal direction, each coupling hole is coupled to an external terminal of a respective battery module, and wherein each coupling hole is provided in a respective one of the first and second end portions.

6. The battery pack of claim 1, wherein the first middle portion has a different shape than the second middle portion.

7. The battery pack of claim 6, wherein the first middle portion has a rectilinear shape, and wherein the second middle portion has a curved shape.

8. The battery pack of claim 1, wherein the first middle portion extends in the longitudinal direction from the first end portion to the second end portion, and wherein the second middle portion extends in the longitudinal direction from the first end portion to the second end portion.

9. The battery pack of claim 7, wherein the first middle portion extends in the longitudinal direction from the first end portion to the second end portion, and wherein the second middle portion extends in the longitudinal direction from the first end portion to the second end portion.

* * * * *